US012620054B2

(12) United States Patent
Wu et al.

(10) Patent No.: US 12,620,054 B2
(45) Date of Patent: May 5, 2026

(54) METHOD AND APPARATUS FOR IMAGE PROCESSING

(71) Applicant: BEIJING ZITIAO NETWORK TECHNOLOGY CO., LTD., Beijing (CN)

(72) Inventors: Jinyuan Wu, Beijing (CN); Yuanhuang Zhang, Beijing (CN); Yi Guo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 18/566,978

(22) PCT Filed: May 16, 2022

(86) PCT No.: PCT/CN2022/093171
§ 371 (c)(1),
(2) Date: Dec. 4, 2023

(87) PCT Pub. No.: WO2023/005359
PCT Pub. Date: Feb. 2, 2023

(65) Prior Publication Data
US 2024/0265489 A1 Aug. 8, 2024

(30) Foreign Application Priority Data
Jul. 30, 2021 (CN) .......................... 202110875574.3

(51) Int. Cl.
*G06T 3/40* (2024.01)
*G06F 3/04845* (2022.01)
(Continued)

(52) U.S. Cl.
CPC ............ *G06T 3/40* (2013.01); *G06F 3/04845* (2013.01); *G06T 5/20* (2013.01); *G06T 5/70* (2024.01);
(Continued)

(58) Field of Classification Search
CPC .... G06T 5/20; G06T 5/70; G06T 5/80; G06T 5/90; G06T 3/40; G06T 7/90;
(Continued)

(56) References Cited

U.S. PATENT DOCUMENTS

| | | | |
|---|---|---|---|
| 2003/0128212 A1* | 7/2003 | Pitkow | ................. G06T 11/206 345/440 |
| 2004/0101206 A1* | 5/2004 | Morimoto | ............... G06T 11/60 382/254 |

(Continued)

FOREIGN PATENT DOCUMENTS

| | | |
|---|---|---|
| CN | 104898919 A | 9/2015 |
| CN | 107637089 A | 1/2018 |

(Continued)

OTHER PUBLICATIONS

International Search Report (with English translation) and Written Opinion issued in PCT/CN2022/093171, dated Aug. 17, 2022, 10 pages provided.

(Continued)

*Primary Examiner* — Wesner Sajous
(74) *Attorney, Agent, or Firm* — Astute IP Law Group

(57) ABSTRACT
A method and apparatus for image processing. The method includes: in response to a first trigger operation from a user, obtaining screen coordinates of the first trigger operation; obtaining, for each first image obtained after the first trigger operation, coordinates of a trigger pixel on the first image based on the screen coordinates of the first trigger operation; and performing, based on the coordinates of the trigger
(Continued)

pixel, effect processing on the first image to obtain an image with a magnifying glass effect.

18 Claims, 8 Drawing Sheets

(51) Int. Cl.

| | |
|---|---|
| *G06T 5/20* | (2006.01) |
| *G06T 5/70* | (2024.01) |
| *G06T 5/80* | (2024.01) |
| *G06T 7/90* | (2017.01) |
| *G06T 11/00* | (2006.01) |

(52) U.S. Cl.
CPC .................. *G06T 5/80* (2024.01); *G06T 7/90* (2017.01); *G06T 11/001* (2013.01); *G06T 2207/10024* (2013.01); *G06T 2207/20101* (2013.01)

(58) Field of Classification Search
CPC ...... G06T 11/001; G06T 11/206; G06T 11/60; G06T 2207/10024; G06T 2207/20101; G06F 3/04845; G06F 3/04812; G06F 3/0488; G06F 3/04842; G06F 3/04886; G06F 3/0481; G06F 2203/04805; G06F 2203/04806; G09G 5/02; G09G 5/10; G09G 2320/0271; G09G 2320/0276; G09G 2320/066; G09G 2320/0666; G06V 10/25; H04N 1/58; H04N 1/6058; H04N 5/445; H04N 5/57–58; H04N 9/64–78
See application file for complete search history.

(56) References Cited

U.S. PATENT DOCUMENTS

| | | | | |
|---|---|---|---|---|
| 2007/0033542 | A1 | 2/2007 | Winser | |
| 2012/0002113 | A1* | 1/2012 | Nishio | ................. H04N 25/611 |
| | | | | 348/E5.077 |
| 2015/0253968 | A1* | 9/2015 | Joo | ..................... G06F 3/04845 |
| | | | | 715/798 |
| 2018/0173393 | A1 | 6/2018 | Verdier et al. | |

FOREIGN PATENT DOCUMENTS

| | | |
|---|---|---|
| CN | 108062760 A | 5/2018 |
| CN | 108648139 A | 10/2018 |
| CN | 105164628 B | 11/2018 |
| CN | 112965780 A | 6/2021 |

OTHER PUBLICATIONS

First Office Action for Chinese Patent Application No. 202110875574.3, mailed on Feb. 10, 2025, 16 pages.

\* cited by examiner

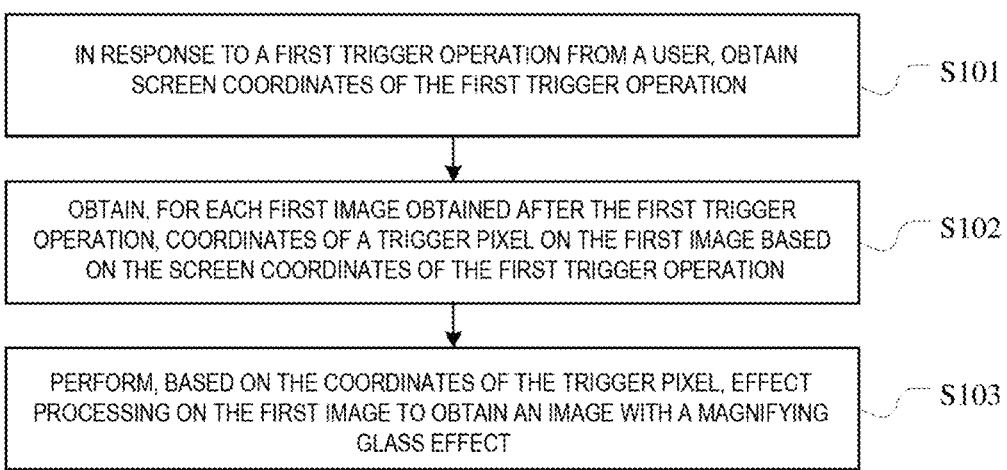

IN RESPONSE TO A FIRST TRIGGER OPERATION FROM A USER, OBTAIN SCREEN COORDINATES OF THE FIRST TRIGGER OPERATION — S101

OBTAIN, FOR EACH FIRST IMAGE OBTAINED AFTER THE FIRST TRIGGER OPERATION, COORDINATES OF A TRIGGER PIXEL ON THE FIRST IMAGE BASED ON THE SCREEN COORDINATES OF THE FIRST TRIGGER OPERATION — S102

PERFORM, BASED ON THE COORDINATES OF THE TRIGGER PIXEL, EFFECT PROCESSING ON THE FIRST IMAGE TO OBTAIN AN IMAGE WITH A MAGNIFYING GLASS EFFECT — S103

FIG. 1

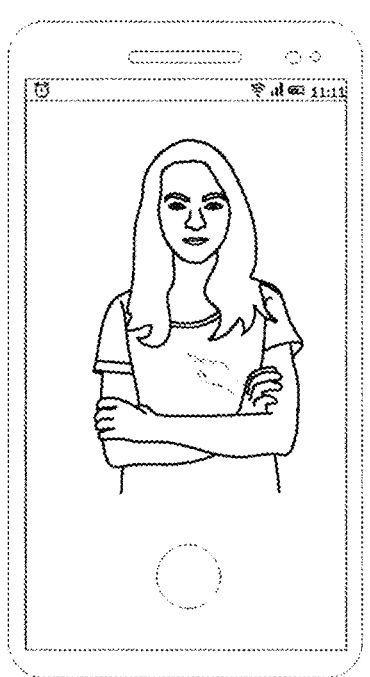

FIG. 2

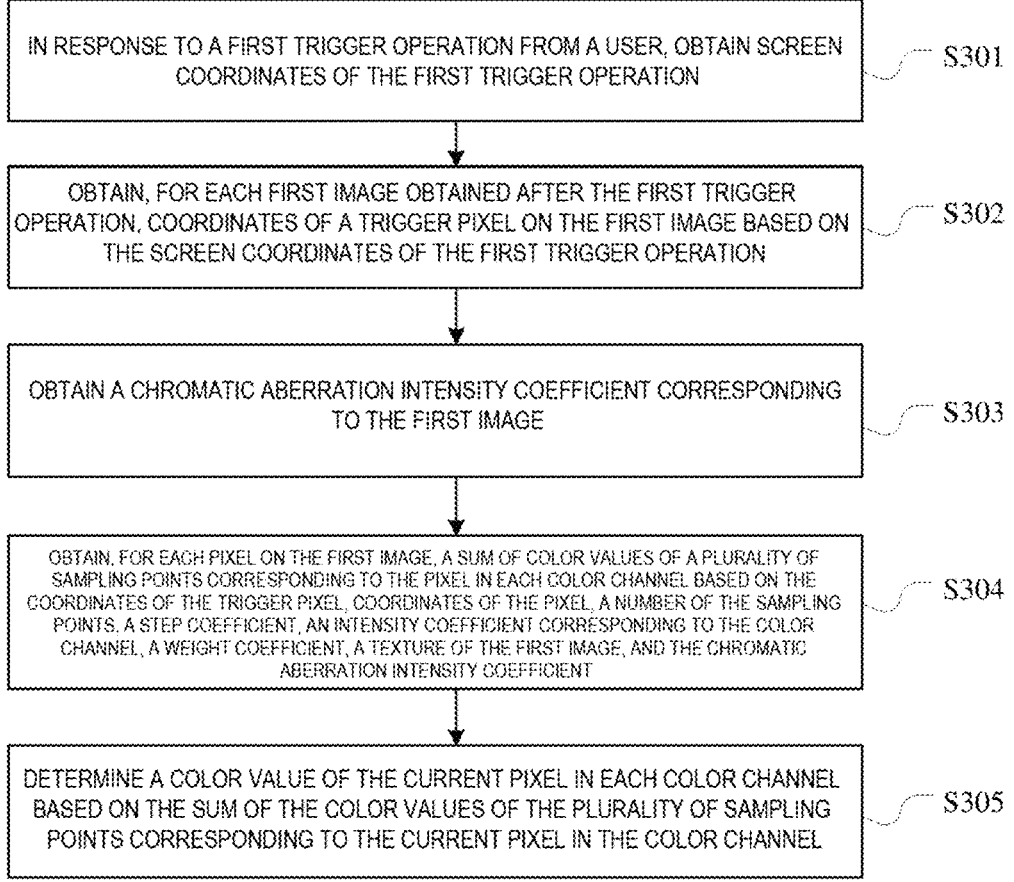

IN RESPONSE TO A FIRST TRIGGER OPERATION FROM A USER, OBTAIN SCREEN COORDINATES OF THE FIRST TRIGGER OPERATION — S301

OBTAIN, FOR EACH FIRST IMAGE OBTAINED AFTER THE FIRST TRIGGER OPERATION, COORDINATES OF A TRIGGER PIXEL ON THE FIRST IMAGE BASED ON THE SCREEN COORDINATES OF THE FIRST TRIGGER OPERATION — S302

OBTAIN A CHROMATIC ABERRATION INTENSITY COEFFICIENT CORRESPONDING TO THE FIRST IMAGE — S303

OBTAIN, FOR EACH PIXEL ON THE FIRST IMAGE, A SUM OF COLOR VALUES OF A PLURALITY OF SAMPLING POINTS CORRESPONDING TO THE PIXEL IN EACH COLOR CHANNEL BASED ON THE COORDINATES OF THE TRIGGER PIXEL, COORDINATES OF THE PIXEL, A NUMBER OF THE SAMPLING POINTS, A STEP COEFFICIENT, AN INTENSITY COEFFICIENT CORRESPONDING TO THE COLOR CHANNEL, A WEIGHT COEFFICIENT, A TEXTURE OF THE FIRST IMAGE, AND THE CHROMATIC ABERRATION INTENSITY COEFFICIENT — S304

DETERMINE A COLOR VALUE OF THE CURRENT PIXEL IN EACH COLOR CHANNEL BASED ON THE SUM OF THE COLOR VALUES OF THE PLURALITY OF SAMPLING POINTS CORRESPONDING TO THE CURRENT PIXEL IN THE COLOR CHANNEL — S305

FIG. 3

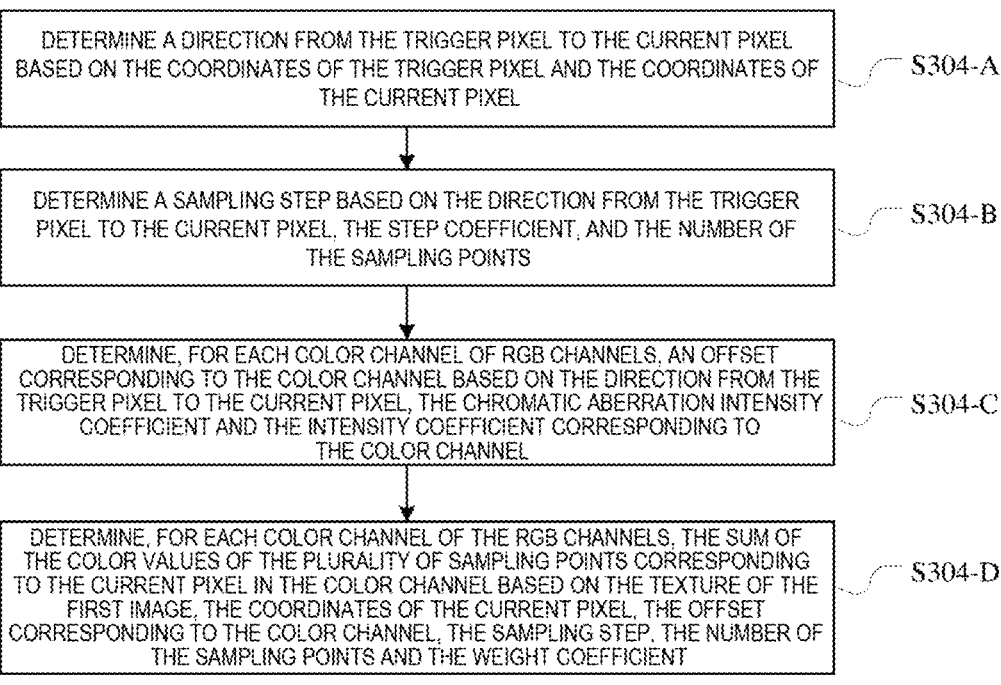

DETERMINE A DIRECTION FROM THE TRIGGER PIXEL TO THE CURRENT PIXEL BASED ON THE COORDINATES OF THE TRIGGER PIXEL AND THE COORDINATES OF THE CURRENT PIXEL ⟋ S304-A

DETERMINE A SAMPLING STEP BASED ON THE DIRECTION FROM THE TRIGGER PIXEL TO THE CURRENT PIXEL, THE STEP COEFFICIENT, AND THE NUMBER OF THE SAMPLING POINTS ⟋ S304-B

DETERMINE, FOR EACH COLOR CHANNEL OF RGB CHANNELS, AN OFFSET CORRESPONDING TO THE COLOR CHANNEL BASED ON THE DIRECTION FROM THE TRIGGER PIXEL TO THE CURRENT PIXEL, THE CHROMATIC ABERRATION INTENSITY COEFFICIENT AND THE INTENSITY COEFFICIENT CORRESPONDING TO THE COLOR CHANNEL ⟋ S304-C

DETERMINE, FOR EACH COLOR CHANNEL OF THE RGB CHANNELS, THE SUM OF THE COLOR VALUES OF THE PLURALITY OF SAMPLING POINTS CORRESPONDING TO THE CURRENT PIXEL IN THE COLOR CHANNEL BASED ON THE TEXTURE OF THE FIRST IMAGE, THE COORDINATES OF THE CURRENT PIXEL, THE OFFSET CORRESPONDING TO THE COLOR CHANNEL, THE SAMPLING STEP, THE NUMBER OF THE SAMPLING POINTS AND THE WEIGHT COEFFICIENT ⟋ S304-D

FIG. 4

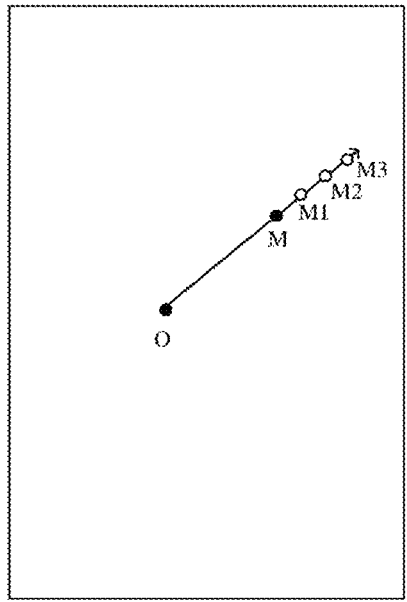

FIG. 5

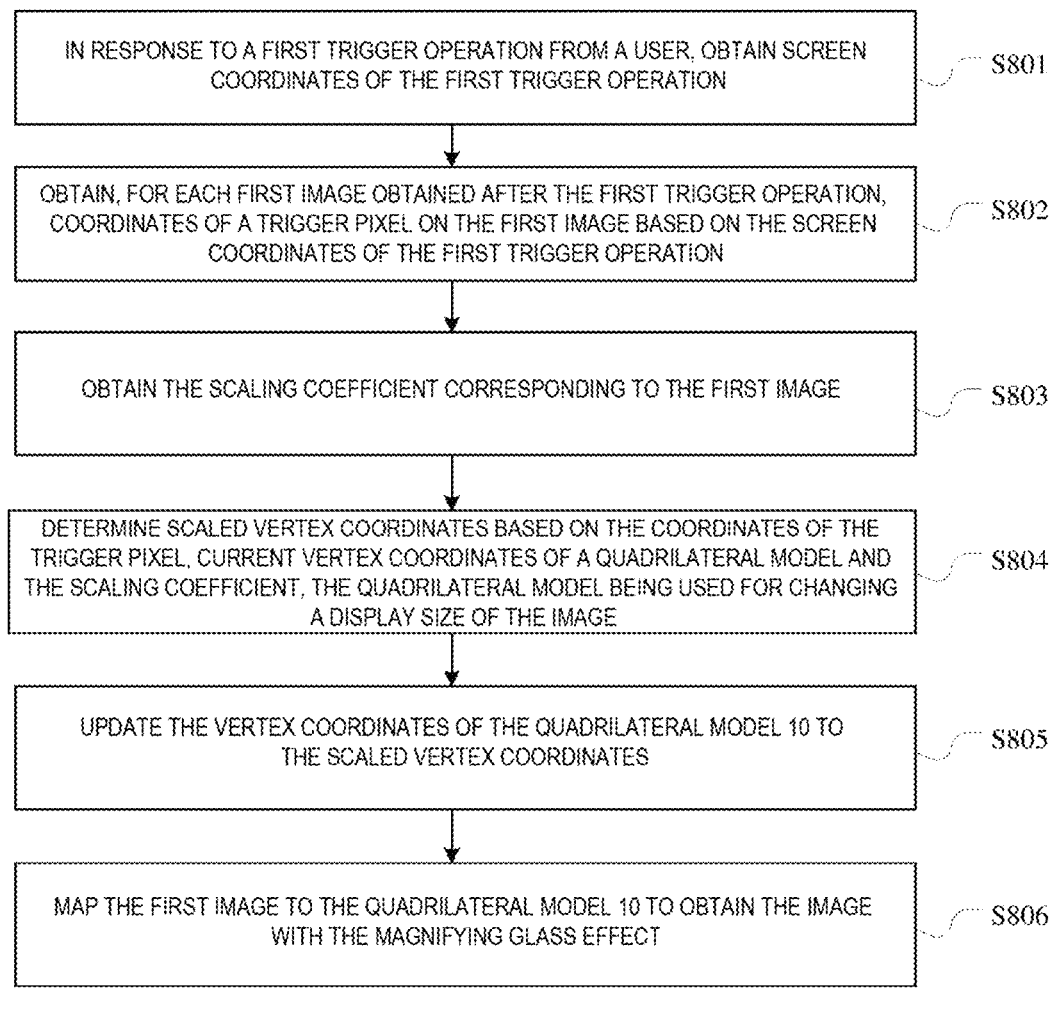

IN RESPONSE TO A FIRST TRIGGER OPERATION FROM A USER, OBTAIN SCREEN COORDINATES OF THE FIRST TRIGGER OPERATION — S801

OBTAIN, FOR EACH FIRST IMAGE OBTAINED AFTER THE FIRST TRIGGER OPERATION, COORDINATES OF A TRIGGER PIXEL ON THE FIRST IMAGE BASED ON THE SCREEN COORDINATES OF THE FIRST TRIGGER OPERATION — S802

OBTAIN THE SCALING COEFFICIENT CORRESPONDING TO THE FIRST IMAGE — S803

DETERMINE SCALED VERTEX COORDINATES BASED ON THE COORDINATES OF THE TRIGGER PIXEL, CURRENT VERTEX COORDINATES OF A QUADRILATERAL MODEL AND THE SCALING COEFFICIENT, THE QUADRILATERAL MODEL BEING USED FOR CHANGING A DISPLAY SIZE OF THE IMAGE — S804

UPDATE THE VERTEX COORDINATES OF THE QUADRILATERAL MODEL 10 TO THE SCALED VERTEX COORDINATES — S805

MAP THE FIRST IMAGE TO THE QUADRILATERAL MODEL 10 TO OBTAIN THE IMAGE WITH THE MAGNIFYING GLASS EFFECT — S806

FIG. 8

METHOD AND APPARATUS FOR IMAGE PROCESSING

CROSS-REFERENCE TO RELATED APPLICATION(S)

This application claims the benefit of Chinese Patent Application No. 202110875574.3 filed on Jul. 30, 2021, entitled "METHOD AND APPARATUS FOR IMAGE PROCESSING", which is hereby incorporated by reference in its entirety.

FIELD

The present disclosure relates to the field of image processing and in particular, to a method and apparatus for image processing.

BACKGROUND

With the development of software development technology, there are more and more types of applications (Apps) on mobile terminals. Among them, video APPs are popular among the public. Users can not only browse videos through video apps, but also create and post videos by themselves. Users may add effects to videos, thereby enhancing user participation. However, the current diversification of effects is not enough, and user needs cannot be met.

SUMMARY

The present disclosure provides a method and apparatus for image processing.

In a first aspect, the present disclosure provides a method for image processing comprising: in response to a first trigger operation from a user, obtaining screen coordinates of the first trigger operation; obtaining, for each first image obtained after the first trigger operation, coordinates of a trigger pixel on the first image based on the screen coordinates of the first trigger operation; and performing, based on the coordinates of the trigger pixel, an effect processing on the first image to obtain an image with a magnifying glass effect.

Optionally, performing the effect processing on the first image based on the coordinates of the trigger pixel to obtain the image with the magnifying glass effect comprises: obtaining a processing parameter corresponding to the first image based on a frame number of the first image and first mapping, the processing parameter comprising at least one of a chromatic aberration intensity coefficient, a distortion coefficient, a scaling coefficient, and a blur coefficient, the first mapping is used for indicating a correspondence between the frame number and the processing parameter; and performing, based on the coordinates of the trigger pixel and the processing parameter corresponding to the first image, the effect processing on the first image to obtain the image with the magnifying glass effect, wherein the effect processing corresponds to the processing parameter and comprises at least one of radial chromatic aberration processing, distortion processing, scaling processing, or radial blur processing.

Optionally, the processing parameter comprises the chromatic aberration intensity coefficient, and the effect processing comprises the radial chromatic aberration processing, and wherein performing the effect processing on the first image based on the coordinates of the trigger pixel and the processing parameter corresponding to the first image comprises: obtaining, for each pixel on the first image, a sum of color values of a plurality of sampling points corresponding to the pixel in each color channel based on the coordinates of the trigger pixel, coordinates of the pixel, a number of the sampling points, a step coefficient, an intensity coefficient corresponding to the color channel, a weight coefficient, a texture of the first image, and the chromatic aberration intensity coefficient; and determining a color value of the pixel in each color channel based on the sum of the color values of the plurality of sampling points corresponding to the pixel in the color channel.

Optionally, obtaining the sum of color values of the plurality of sampling points corresponding to the pixel in each color channel based on the coordinates of the trigger pixel, the coordinates of the pixel, the number of the sampling points, the step coefficient, the intensity coefficient corresponding to the color channel, the weight coefficient, the texture of the first image, and the chromatic aberration intensity coefficient comprises: determining a direction from the trigger pixel to the pixel based on the coordinates of the trigger pixel and the coordinates of the pixel; determining a sampling step based on the direction from the trigger pixel to the pixel, the step coefficient, and the number of the sampling points; determining, for each color channel of RGB channels, an offset corresponding to the color channel based on the direction from the trigger pixel to the pixel, the step coefficient, and the number of the sampling points, the chromatic aberration intensity coefficient and the intensity coefficient corresponding to the color channel; and determining, for each color channel of the RGB channels, the sum of the color values of the plurality of sampling points corresponding to the pixel in the color channel based on the texture of the first image, the coordinates of the pixel, the offset corresponding to the color channel, the sampling step, the number of the sampling points and the weight coefficient.

Optionally, determining the color value of the pixel in each color channel based on the sum of the color values of the plurality of sampling points corresponding to the pixel in the color channel comprises: for each color channel of RGB channels, dividing the sum of the color values of the plurality of sampling points corresponding to the pixel in the color channel by the number of the sampling points to obtain the color value of the pixel in the color channel.

Optionally, the processing parameter comprises the distortion coefficient, and the effect processing comprises the distortion processing, and wherein performing the effect processing on the first image based on the coordinates of the trigger pixel and the processing parameter corresponding to the first image comprises: obtaining a distortion function based on the distortion coefficient; determining, for each pixel on the first image, a pixel before distortion on the first image based on the coordinates of the trigger pixel, the coordinates of the pixel, a distance from the trigger pixel to the pixel and the distortion function, the pixel before distortion corresponding to the pixel; and determining a color value of the pixel before distortion as the color value of the pixel.

Optionally, the processing parameter comprises the scaling coefficient, and the effect processing comprises the scaling processing, and wherein performing the effect processing on the first image based on the coordinates of the trigger pixel and the processing parameter corresponding to the first image comprises: determining scaled vertex coordinates based on the coordinates of the trigger pixel, current vertex coordinates of a quadrilateral model and the scaling coefficient, the quadrilateral model being used for changing a display size of the image; updating the vertex coordinates of the quadrilateral model to the scaled vertex coordinates; and mapping the first image to the quadrilateral model to obtain the image with the magnifying glass effect.

Optionally, the processing parameter comprises the blur coefficient, and the effect processing comprises the radial blur processing, and wherein performing the effect processing on the first image based on the coordinates of the trigger pixel and the processing parameter corresponding to the first image comprises: obtaining, for each pixel on the first image, a sum of color values of a plurality of sampling points corresponding to the pixel based on the coordinates of the trigger pixel, coordinates of the pixel, a number of the sampling points, a texture of the first image, and the blur coefficient; and obtaining a color value of the pixel based on the sum of the color values of the plurality of sampling points corresponding to the pixel.

Optionally, obtaining the sum of color values of the plurality of sampling points corresponding to the pixel based on the coordinates of the trigger pixel, the coordinates of the pixel, the number of the sampling points, the texture of the first image, and the blur coefficient comprises: determining a direction from the trigger pixel to the pixel based on the coordinates of the trigger pixel and the coordinates of the pixel; and determining the sum of the color values of the plurality of sampling points corresponding to the pixel based on the coordinates of the pixel, the number of the sampling points, the blur coefficient, the texture of the first image and the direction from the trigger pixel to the pixel.

Optionally, obtaining the color value of the pixel based on the sum of the color values of the plurality of sampling points corresponding to the pixel comprises: dividing the sum of the color values of the plurality of sampling points corresponding to the pixel by the number of the sampling points to obtain the color value of the pixel.

Optionally, performing the effect processing on the first image based on the coordinates of the trigger pixel and the processing parameter corresponding to the first image comprises: performing, based on the coordinates of the trigger pixel and the processing parameter corresponding to the first image, the radial chromatic aberration processing, the distortion processing, the scaling processing, and the radial blur processing in sequence on the first image.

Optionally, in the first mapping, the frame number is positively correlated with the chromatic aberration intensity coefficient, the scaling coefficient and the blur coefficient respectively, and the frame number is negatively correlated with the distortion coefficient.

Optionally, the method further comprises: in response to a second trigger operation from the user, obtaining screen coordinates of the second trigger operation; obtaining, for each second image obtained after the second trigger operation, coordinates of a trigger pixel on the second image based on the screen coordinates of the second trigger operation; obtaining a processing parameter corresponding to the second image based on a frame number of the second image and second mapping; and performing, based on the coordinates of the trigger pixel on the second image and the processing parameter corresponding to the second image, effect processing on the second image, in the second mapping, the frame number is negatively correlated with the chromatic aberration intensity coefficient, the scaling coefficient and the blur coefficient respectively, and is positively correlated with the distortion coefficient.

In a second aspect, the present disclosure provides a terminal device comprising: an obtaining module configured for in response to a first trigger operation from a user, obtaining screen coordinates of the first trigger operation; and an effect processing module configured for obtaining, for each first image obtained after the first trigger operation, coordinates of a trigger pixel on the first image based on the screen coordinates of the first trigger operation; and performing, based on the coordinates of the trigger pixel, effect processing on the first image to obtain an image with a magnifying glass effect.

In a third aspect, the present disclosure provides a computer readable storage medium having a computer program stored thereon, wherein the computer program, when executed by a processor, causes the processor to carry out the method according to the first aspect.

In a fourth aspect, the present disclosure provides a terminal device comprising: a processor; and a memory for storing executable instructions by the processor; wherein the processor is configured to carry out the method according to the first aspect.

In a fifth aspect, the present disclosure provides a computer program product, wherein the computer program product comprises a computer program stored in a computer readable storage medium, at least one processor can read the computer program from the computer readable storage medium, and the computer program, when executed by the at least one processor, carries out the method according to the first aspect.

In a sixth aspect, the present disclosure provides a computer program which, when executed by a process, causes the processor to carry out the method according to the first aspect.

BRIEF DESCRIPTION OF THE DRAWINGS

FIG. 1 shows a schematic flowchart of a first embodiment of the method for image processing provided by the present disclosure;

FIG. 2 shows a user interface diagram provided by the present disclosure;

FIG. 3 shows a first schematic flowchart of a second embodiment of the method for image processing provided by the present disclosure;

FIG. 4 shows a second schematic flowchart of the second embodiment of the method for image processing provided by the present disclosure;

FIG. 5 shows a schematic diagram of the radial chromatic aberration processing provided by the present disclosure;

FIG. 8 shows a schematic flowchart of a fourth embodiment of the method for image processing provided by the present disclosure;

DETAILED DESCRIPTION

Figure 6:
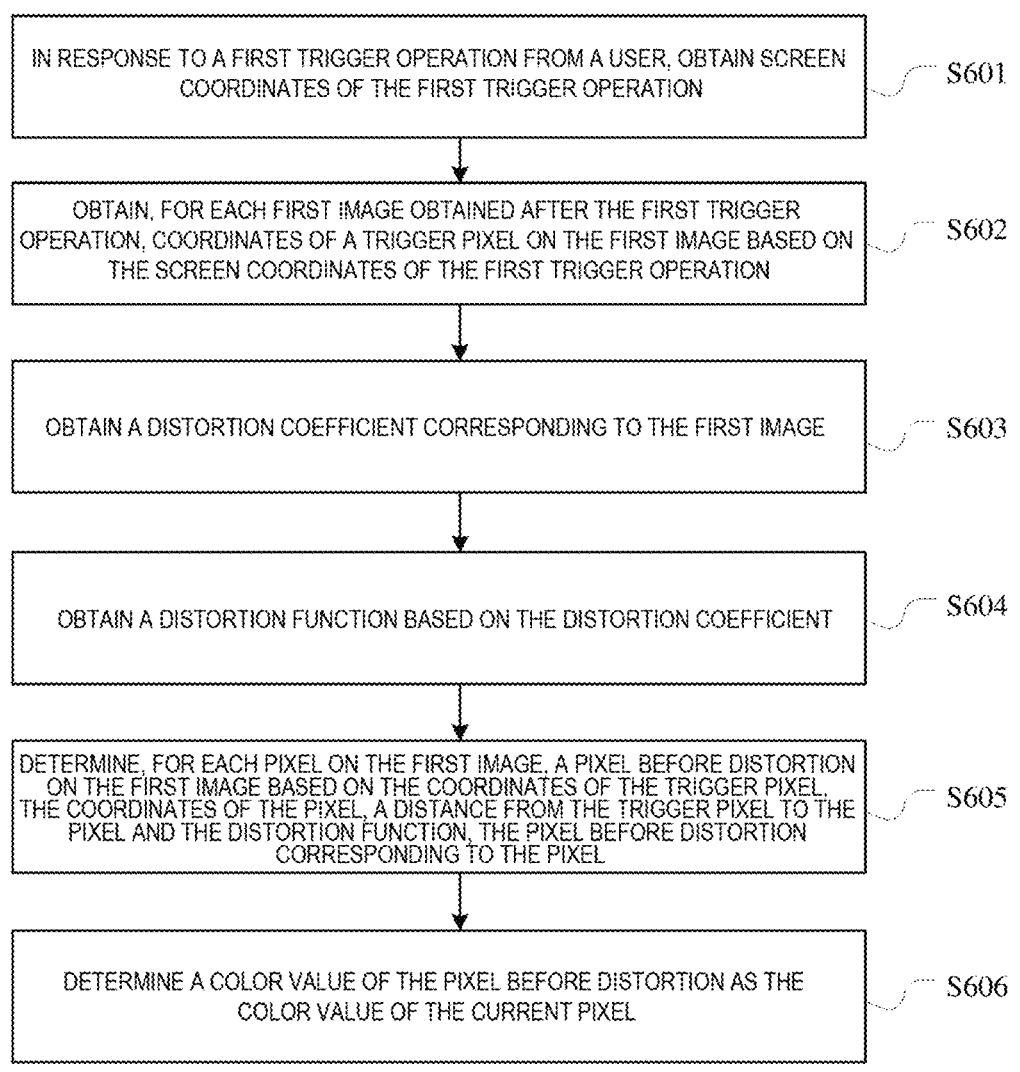
FIG. 6 shows a schematic flowchart of a third embodiment of the method for image processing provided by the present disclosure.

In order to make the objectives, technical solutions and advantages of the present disclosure clearer, the technical solutions of the present disclosure will be described clearly and completely in the following in conjunction with the accompanying drawings of the present disclosure. It is apparent that the embodiments described herein are part of the embodiments of the present disclosure, and not all of the embodiments. Based on the embodiments of the present disclosure, all other embodiments acquired by a person of ordinary skill in the art without creative efforts fall within the scope of protection of the present disclosure.

In the present disclosure, it is to be explained that the terms "first" and "second" are used for descriptive purposes only and are not to be understood as indicating or implying relative importance. Furthermore, the phrase "at least one" refers to one or more, and the phrase "a plurality of" refers to two or more. The phrase "and/or" describes an association of related objects, and indicates that there may exist three types of relationships, for example, A and/or B, which can indicate: the existence of A alone, the existence of both A and B, and the existence of B alone, where A and B may be singular or plural. The character "generally indicates that an "or" relationship between the related objects. The phrase "at least one of the following" or similar expressions refers to any combination of these items, including single item or any combination of plural items. For example, at least one of a, b, or c may indicate: solely a, solely b, solely c, a combination of a and b, a combination of a and c, a combination of b and c, or a combination of a, b and c, where a, b, c may be single or multiple.

The present disclosure provides a method for image processing, which can process the images in a video into images with the magnifying glass effect, thereby increasing the diversity of special effects and improving the user experience. By observing the magnification effect of a real magnifying glass, there are phenomena, such as, radial chromatic aberration, distortion, scaling, and radial blur. The present disclosure simulates these phenomena and processes the images in the video accordingly, so that the processed images can obtain the magnification effect close to that of the real magnifying glass, and the special effect is more realistic.

The method for image processing provided in the present disclosure may be performed by a terminal device, and the form of the terminal device includes, but is not limited to a smartphone, a tablet computer, a laptop, a wearable electronic device, or a smart home device, such as a smart TV. The present disclosure does not limit the form of the terminal device.

In the following, the technical solutions of the present disclosure and how the technical solutions of the present disclosure solve the above technical problems are to be described in detail below in the specific embodiments. The following specific embodiments may be combined with each other, and same or similar concepts or processes may not be repeated in some embodiments. The embodiments of the present disclosure will be described below in conjunction with the accompanying drawings.

The First Embodiment

FIG. 1 shows a schematic flowchart of the first embodiment of the method for image processing provided by the present disclosure. As shown in FIG. 1, the method for image processing provided by the present disclosure comprises:

S101. in response to a first trigger operation from a user, obtaining screen coordinates of the first trigger operation.

By way of example, as shown in FIG. 2, the first trigger operation may include the user's touch operation on the screen, which may include a click operation, a double-click operation, or a sliding operation, etc. The first trigger operation may also include an expression triggering operation, etc. The present disclosure does not limit the specific form of the first trigger operation. The screen coordinates of the first trigger operation refer to the coordinates of the first trigger operation on the screen of the terminal device.

S102. obtaining, for each first image obtained after the first trigger operation, coordinates of a trigger pixel on the first image based on the screen coordinates of the first trigger operation.

For example, the first image may be an image in the video that is captured in real time, or may be a locally saved image that is uploaded by the user or an image in the video, or may be an image transmitted by another device or an image in the video.

For example, after the screen coordinates of the first trigger operation are obtained, the screen coordinates of the first trigger operation may be matched with the coordinates of each pixel on the first image, and the pixel that is successfully matched is determined as a trigger pixel, and the coordinates of the pixel that is successfully matched are determined as the coordinates of the trigger pixel.

S103. performing, based on the coordinates of the trigger pixel, effect processing on the first image to obtain an image with a magnifying glass effect.

In one of the possible implementations, for each first image, the effect processing is performed by using the same processing parameters, and in this case, the magnification of the image obtained by the processing is the same.

In another possible implementation, a correspondence between a frame number and the processing parameter may be established in advance. In the present disclosure, the correspondence is called a first mapping. In processing the first image, the processing parameter corresponding to the first image is first determined based on the frame number of the first image and the first mapping described above, and then, based on the coordinates of the trigger pixel, the effect processing is performed on the first image by using the processing parameter corresponding to the first image. In this case, due to a different processing parameter corresponding to each first image, the amplification degree of the image obtained by the processing is varied.

Optionally, the processing parameter described above may include at least one of the following: a chromatic aberration intensity coefficient, a distortion coefficient, a scaling coefficient, or a radial blur coefficient. The processing process included in the effect processing corresponds to the processing parameter, for example, if the processing parameter includes the chromatic aberration intensity coefficient and the distortion coefficient, then the effect processing includes radial chromatic aberration processing and distortion processing.

For example, in order to achieve that the magnification degree becomes larger frame by frame, in the first mapping, the frame number may be positively correlated with the following three parameters, the chromatic aberration intensity coefficient, the scaling coefficient and the blur coefficient, and be negatively correlated with the distortion coefficient, so as to achieve that the magnification degree of the image becomes larger frame by frame.

In the method for image processing provided by this disclosure, in response to the first trigger operation from the user, obtaining screen coordinates of the first trigger operation; obtaining, for each first image obtained after the first trigger operation, coordinates of the trigger pixel on the first image based on the screen coordinates of the first trigger operation; and performing, based on the coordinates of the trigger pixel, effect processing on the first image to obtain an image with a magnifying glass effect. The above method can process the image in the video into an image with magnifying glass effect, which increases the diversity of special effects and improves the user experience.

The Second Embodiment

FIG. 3 shows a schematic flowchart of a second embodiment of the method for image processing provided by the present disclosure. As described above, the effect processing in the present disclosure may include radial chromatic aberration processing, and this embodiment illustrates a procedure of the radio chromatic aberration processing. As shown in FIG. 3, the method for image processing provided in this embodiment includes:

S301. in response to a first trigger operation from a user, obtaining screen coordinates of the first trigger operation.

S302. obtaining, for each first image obtained after the first trigger operation, coordinates of a trigger pixel on the first image based on the screen coordinates of the first trigger operation.

The implementation process of S301 and S302 refer to the above description, and will not be repeated here in the present application.

S303. obtaining a chromatic aberration intensity coefficient corresponding to the first image.

As described above, the first mapping may be established in advance, which is used for indicating the correspondence between the frame number and the chromatic aberration intensity coefficient. In processing the first image, the chromatic aberration intensity coefficient corresponding to the first image is first determined based on the frame number of the first image and the first mapping, and then, based on the coordinates of the trigger pixel, the effect processing is performed on the first image by using the chromatic aberration intensity coefficient corresponding to the first image.

It should be noted that the essence of performing the radial chromatic aberration processing on the first image is to recalculate the color values of individual pixels on the first image, and after the individual pixels are assigned with the new color values, an image with the radial chromatic aberration effect is obtained. Specifically, the procedure of the radial chromatic aberration processing may include S304-S305.

S304. obtaining, for each pixel on the first image, a sum of color values of a plurality of sampling points corresponding to the pixel in each color channel based on the coordinates of the trigger pixel, coordinates of the pixel, a number of the sampling points, a step coefficient, an intensity coefficient corresponding to the color channel, a weight coefficient, a texture of the first image, and the chromatic aberration intensity coefficient.

In one of the possible implementations, the sum of color values of the plurality of sampling points corresponding to the pixel in each color channel may be obtained by the following steps. Taking any of the pixels on the first image as an example, for the purpose of illustration, the pixel is referred to as the current pixel in the present disclosure, as shown in FIG. 4, it specifically includes:

S304-A. determining a direction from the trigger pixel to the current pixel based on the coordinates of the trigger pixel and the coordinates of the current pixel.

S304-B. determining a sampling step based on the direction from the trigger pixel to the current pixel, the step coefficient, and the number of the sampling points.

Specifically, the sampling step may be determined by the following equation:

$$step = dir * radius\ Strength * u\_Sample$$

where step represents the sampling step, dir represents the direction from the trigger pixel to the current pixel, radiusStrength represents the step coefficient, u_Sample represents the number of the sampling points, where the step coefficient and the number of the sampling points may be predetermined values.

S304-C. determining, for each color channel of RGB channels, an offset corresponding to the color channel based on the direction from the trigger pixel to the current pixel, the chromatic aberration intensity coefficient and the intensity coefficient corresponding to the color channel.

Specifically, the offset corresponding to the red channel may be determined by the following equation:

$$red\ Offset = dir * u\_Strength * u\_Red\ Strength$$

where redOffset represents the offset corresponding to the red channel, dir represents the direction from the trigger pixel to the current pixel, u_Strength represents the chromatic aberration intensity coefficient, which may be obtained by S302, u_RedStrength represents the intensity coefficient corresponding to the red channel, which may be a predetermined value.

The offset corresponding to the green channel may be determined by the following equation:

$$green\ Offset = dir * u\_Strength * u\_Green\ Strength$$

where greenOffset represents the offset corresponding to the green channel, dir represents the direction from the trigger pixel to the current pixel, u_Strength represents the chromatic aberration intensity coefficient, which may be obtained by S302, u_GreenStrength represents the intensity coefficient corresponding to the green channel, which may be a predetermined value.

The offset corresponding to the blue channel may be determined by the following equation:

$$blue\ Offset = dir * u\_Strength * u\_Blue\ Strength$$

where blueOffset represents the offset corresponding to the blue channel, dir represents the direction from the trigger pixel to the current pixel, u_Strength represents the chromatic aberration intensity coefficient, which may be obtained by S302, u_BlueStrength represents the intensity coefficient corresponding to the blue channel, which may be a predetermined value.

S304-D. determining, for each color channel of the RGB channels, the sum of the color values of the plurality of sampling points corresponding to the current pixel in the color channel based on the texture of the first image, the coordinates of the current pixel, the offset corresponding to the color channel, the sampling step, the number of the sampling points and the weight coefficient.

Specifically, for any of the color channels, a loop statement may be used to determine the sum of the color values of a plurality of sampling points corresponding to the current pixel in the color channel. Taking the red channel as an example, the formula in the loop statement is as below:

$$R \mathrel{+}= \text{texture } 2D(\text{Input Texture, } uv + \text{red Offset}).r * \text{weight}$$

Each time a loop is completed, the offset corresponding to the red channel is subtracted by one step, and the number of loops is equal to the number of sampling points. R represents the sum of the color values of the plurality of sampling points in the red channel, InputTexture represents the texture of the first image, uv represents the coordinates of the current pixel point, redOffset represents the offset corresponding to the red channel, weight represents the weight coefficient, which may be a predetermined value.

S305. determining a color value of the current pixel in each color channel based on the sum of the color values of the plurality of sampling points corresponding to the current pixel in the color channel.

For each channel, the color value of the current pixel in the color channel may be obtained from the following formula, which takes the red channel as an example: R/=u_Sample, where R represents the sum of the color values of a plurality of sampling points corresponding to the current pixel in the red channel, and u_Sample represents the number of sampling points.

An example is given below:

Referring to FIG. 5, assuming that the pixel O is the trigger pixel, the pixel M is the current pixel, and a plurality of sampling points corresponding to the current pixel are M1, M2 and M3, the sum of the color values of M1, M2 and M3 in channel R is obtained by the above method as R1+R2+R3, and the sum of the color values of M1, M2 and M3 in channel G is obtained by the above method as G1+G2+G3, the sum of color values of M1, M2 and M3 in channel B is B1+B2+B3, then the RGB values of M may be determined as: (R1+R2+R3)/3, (G1+G2+G3)/3, (B1+B2+B3)/3.

By performing the processing as S304-S305 above on all pixels on the first image, the RGB values of all pixels can be obtained. By assigning the calculated RGB values to the corresponding pixel points, the image processed by the radial chromatic aberration processing can be obtained.

The method for image processing provided in the embodiment provides a method of radial chromatic aberration processing, and the image processed by applying this method has the effect of radial chromatic aberration in a real magnifying glass, and the effect is highly realistic.

The Third Embodiment

FIG. 6 shows a schematic flowchart of the third embodiment of the method for image processing provided by the present disclosure. As described above, the effect processing in the present disclosure may include distortion processing, and this embodiment illustrates a procedure of the distortion processing. As shown in FIG. 6, the method for image processing provided in this embodiment includes:

S601. in response to a first trigger operation from a user, obtaining screen coordinates of the first trigger operation.

S602. obtaining, for each first image obtained after the first trigger operation, coordinates of a trigger pixel on the first image based on the screen coordinates of the first trigger operation.

The implementation process of S601 and S602 refer to the above description, and will not be repeated here in the present application.

S603. obtaining a distortion coefficient corresponding to the first image.

As described above, the first mapping may be established in advance, which is used for indicating the correspondence between the frame number and the distortion coefficient. In processing the first image, the distortion coefficient corresponding to the first image is first determined based on the frame number of the first image and the first mapping, and then, based on the coordinates of the trigger pixel, the effect processing is performed on the first image by using the distortion coefficient corresponding to the first image.

The procedure of the distortion processing will be introduced below. It should be noted that as described above, the essence of the radial chromatic aberration processing is to recalculate the color values of individual pixels on the first image. Analogously, the essence of the distortion processing is to recalculate the color values of individual pixels on the first image. After the individual pixels are assigned with the new color values, an image with the distortion effect is obtained. Specifically, S604-S607 are included.

S604. obtaining a distortion function based on the distortion coefficient.

In one of the possible implementations, assuming that $f(x)=(k-1)x^2+x$, all functions with the value of k satisfying $0.5 \leq k \leq 1.0$ can be used as the distortion function, and k can be used as the distortion coefficient, Assuming that the value of k obtained in S603 is 0.75, then the distortion function is $f(x)=(0.75-1)x^2+x=-0.25x^2+x$.

S605. determining, for each pixel on the first image, a pixel before distortion on the first image based on the coordinates of the trigger pixel, the coordinates of the pixel, a distance from the trigger pixel to the pixel and the distortion function, the pixel before distortion corresponding to the pixel.

Specifically, taking any of the pixels on the first image as an example, for the purpose of illustration, the pixel is referred to as the current pixel in the present disclosure. The pixel before distortion corresponding to the current pixel may be determined through the formula as below:

$$uv = (\text{texture Coordinate} - \text{center}) * \left(\frac{f(dis)}{dis}\right) + \text{center}$$

where uv represents the coordinates of the pixel before distortion corresponding to the current pixel, textureCoordinate represents the coordinates of the current pixel, center represents the coordinates of the trigger pixel, dis represents the distance from the trigger pixel to the current pixel, and f represents the distortion function.

S606. determining a color value of the pixel before distortion as the color value of the current pixel.

After the coordinates of the pixel before distortion corresponding to the current pixel are determined through the above S605, the pixel before distortion can be found on the first image, and the color value of the pixel before distortion is determined as the color value of the current pixel.

Figure 7:
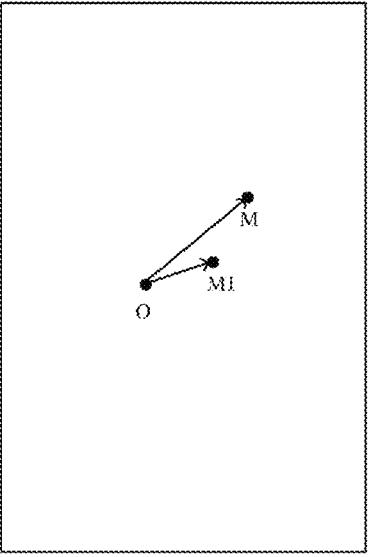
FIG. 7 shows a schematic diagram of the distortion processing provided by the present disclosure.

An example is given below:

FIG. 7 shows the image processed by the radial chromatic aberration processing. Assuming that the pixel O is the trigger pixel, the pixel M is the current pixel, the pixel before distortion corresponding to the pixel M that is obtained by S605 is M1, and the RGB values of M1 are R1, G1, and B1, then the RGB values of pixel M may be determined as R1, G1, and B1.

By performing the same processing as S605-S606 on all pixels on the first image, the color values of all pixels can be obtained. By assigning the calculated color values to the individual pixels, the image processed by the distortion processing can be obtained.

The method for image processing provided in the embodiment provides a method of distortion processing, and the image processed by applying this method has the distortion effect in a real magnifying glass, and the effect is highly realistic.

The Fourth Embodiment

FIG. 8 shows a schematic flowchart of the fourth embodiment of the method for image processing provided by the present disclosure. As described above, the effect processing in the present disclosure may include scaling processing, and this embodiment illustrates a procedure of the scaling processing. As shown in FIG. 8, the method for image processing provided in this embodiment includes:

S801. in response to a first trigger operation from a user, obtaining screen coordinates of the first trigger operation.

S802. obtaining, for each first image obtained after the first trigger operation, coordinates of a trigger pixel on the first image based on the screen coordinates of the first trigger operation.

The implementation process of S801 and S802 refer to the above description, and will not be repeated here in the present application.

S803. obtaining the scaling coefficient corresponding to the first image.

As described above, the first mapping may be established in advance, which is used for indicating the correspondence between the frame number and the scaling coefficient. In processing the first image, the scaling coefficient corresponding to the first image is first determined based on the frame number of the first image and the first mapping, and then, based on the coordinates of the trigger pixel, the effect processing is performed on the first image by using the scaling coefficient corresponding to the first image.

The procedure of the scaling processing will be introduced below, which specifically includes S804-S806.

S804. determining scaled vertex coordinates based on the coordinates of the trigger pixel, current vertex coordinates of a quadrilateral model 10 and the scaling coefficient, the quadrilateral model 10 being used for changing a display size of the image.

Specifically, the scaled vertex coordinates may be calculated through the formula as below:

$$pos1 = (pos - center) * scale + center$$

where pos represents the current vertex coordinates of the quadrilateral model 10, center represents the coordinates of the trigger pixel, scale represents the scaling coefficient, pos1 represents the scaled vertex coordinates.

S805. updating the vertex coordinates of the quadrilateral model 10 to the scaled vertex coordinates.

Figure 9:
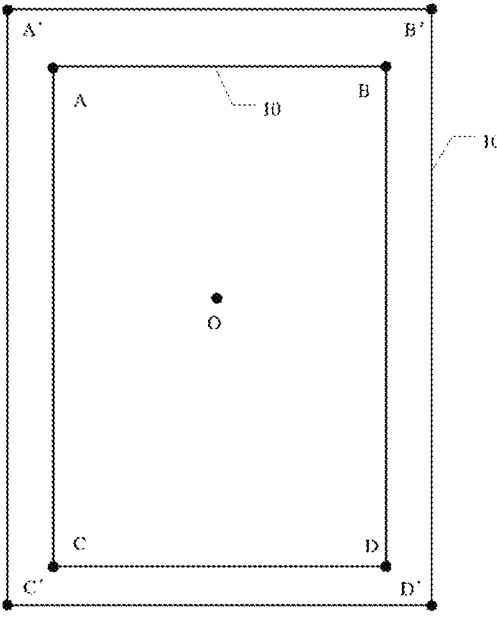
FIG. 9 shows a schematic diagram of the scaling processing provided by the present disclosure.

An example is given below:

As shown in FIG. 9, assuming that the pixel O is the trigger pixel, the current vertex coordinates of the quadrilateral model 10 are A, B, C and D, the scaling coefficient obtained by S803 is 1, it can be determined that the quadrilateral model 10 needs to be doubled with the point O as the center, and the scaled vertices are represented by A', B', C' and D'.

S806. mapping the first image to the quadrilateral model 10 to obtain the image with the magnifying glass effect.

The method for image processing provided in the embodiment provides a method of scaling processing, and the image processed by applying this method has the scaling effect in a real magnifying glass, and the effect is highly realistic.

The Fifth Embodiment

Figure 10:
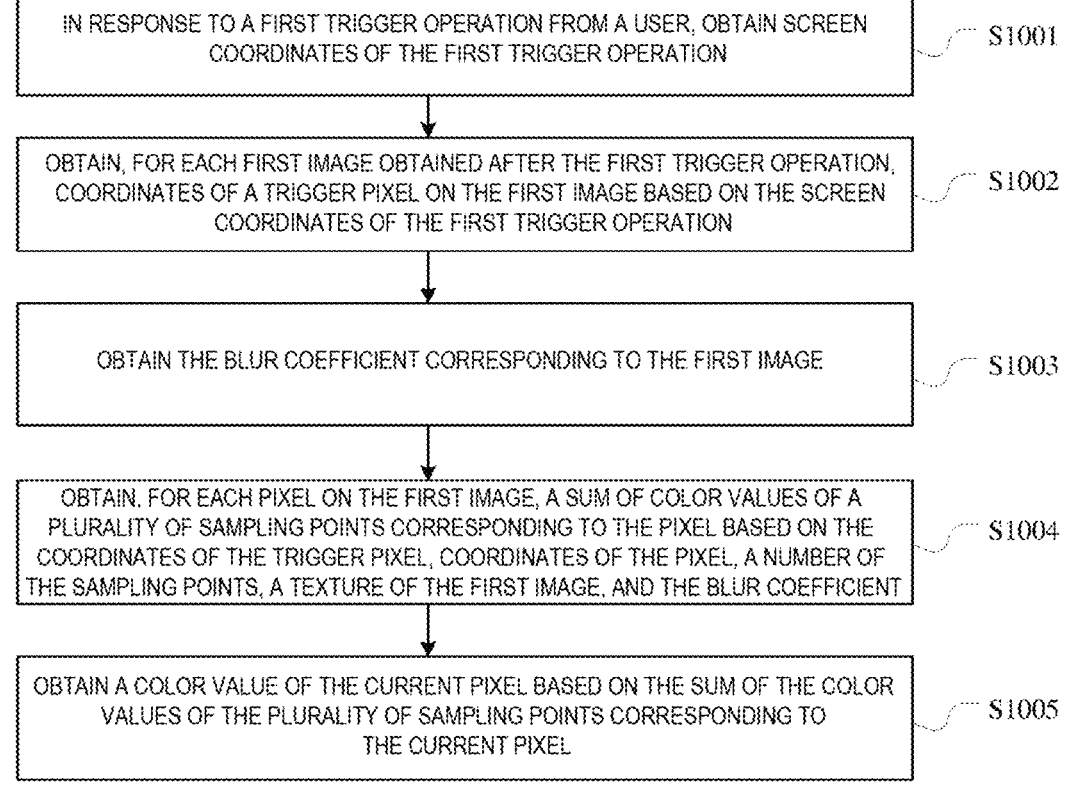
FIG. 10 shows a schematic flowchart of a fifth embodiment of the method for image processing provided by the present disclosure.

FIG. 10 is a schematic flowchart of the fifth embodiment of the method for image processing provided by the present disclosure. As described above, the effect processing in the present disclosure may include radial blur processing, and this embodiment illustrates a procedure of the radial blur processing. As shown in FIG. 10, the method for image processing provided in this embodiment includes:

S1001. in response to a first trigger operation from a user, obtaining screen coordinates of the first trigger operation.

S1002. obtaining, for each first image obtained after the first trigger operation, coordinates of a trigger pixel on the first image based on the screen coordinates of the first trigger operation.

The implementation process of S1001 and S1002 refer to the above description, and will not be repeated here in the present application.

S1003. obtaining the blur coefficient corresponding to the first image.

As described above, the first mapping may be established in advance, which is used for indicating the correspondence between the frame number and the blur coefficient. In processing the first image, the blur coefficient corresponding to the first image is first determined based on the frame number of the first image and the first mapping, and then, based on the coordinates of the trigger pixel, the effect processing is performed on the first image by using the blur coefficient corresponding to the first image.

Analogous to the radial chromatic aberration processing and the distortion processing, the essence of the radial blur processing is to recalculate the color values of individual pixels on the first image, and after the individual pixels are assigned with the new color values, an image with the radial blur effect is obtained. Specifically, S1004-S1005 are included.

S1004. obtaining, for each pixel on the first image, a sum of color values of a plurality of sampling points corresponding to the pixel based on the coordinates of the trigger pixel, coordinates of the pixel, a number of the sampling points, a texture of the first image, and the blur coefficient.

Taking any of the pixels on the first image as an example, for the purpose of illustration, the pixel is referred to as the current pixel in the present disclosure. The sum of color values of the plurality of sampling points corresponding to the current pixel may be determined through the following method:

First, the direction from the trigger pixel to the current pixel is determined based on the coordinates of the trigger pixel and the coordinates of the current pixel. The specific procedure refers to the above embodiments, and the details will not be repeated herein. The sum of the color values of the plurality of sampling points corresponding to the current pixel is determined based on the coordinates of the current pixel, a number of the sampling points, the blur coefficient, the texture of the first image, and the direction from the trigger pixel to the current pixel.

Specifically, a loop statement may be used to determine the sum of the color values of a plurality of sampling points corresponding to the current pixel in the color channel. The formula in the loop statement is as below:

$$vec2uv = uv + \text{blur factor} * dir * i;$$

$$\text{out Color} += \text{texture } 2D(\text{Input Texture}, uv)$$

where i represents a loop variable, the number of loops is equal to the number of the sampling points, uv represents the coordinates of the current pixel, blurfactor represents the blur coefficient, dir represents the direction from the trigger pixel to the current pixel, InputTexture represents the texture of the first image, outColor represents the sum of the color values of the plurality of sampling points, vec 2 represents the coordinates of the current pixel, and uv represents a two-dimensional vector.

S1005. obtaining a color value of the current pixel based on the sum of the color values of the plurality of sampling points corresponding to the current pixel.

Specifically, the color value of the current pixel may be obtained by the following formula: outColor/=u_Sample, where outColor represents the sum of the color values of the plurality of sampling points corresponding to the current pixel, u_Sample represents the number of the sampling points.

By performing the processing as S1004-S1005 on all pixels on the first image, the color values of all pixels can be obtained. By assigning the calculated color values to the corresponding pixel points, the image processed by the radial blur processing can be obtained.

The method for image processing provided in the embodiment provides a method of radial blur processing, and the image processed by applying this method has the radial blur effect in a real magnifying glass, and the effect is highly realistic.

In one of the possible implementations, the radial chromatic aberration processing, the distortion processing, the scaling processing, and the radial blur processing may be performed in sequence on the first image based on the coordinates of the trigger pixel and the processing parameter corresponding to the first image. In such an implementation, the result after the radial chromatic aberration processing is the object of the distortion processing, that is, the first image in the procedure of the distortion processing as shown in FIG. 6 is the image after the radial chromatic aberration processing. The result of the distortion processing is the object of the scaling processing, that is, the first image in the procedure of the scaling processing as shown in FIG. 8 is the image processed by the distortion processing. The result of the scaling processing is the object of the radial blur processing, that is, the first image in the procedure of the radial blur as shown in FIG. 10 is the image processed by the scaling processing. The image obtained by such a processing sequence is closer to the effect of the real magnifying glass.

By way of example, in the first mapping, if the frame number may be positively correlated with the three follow-ing parameters, that is, the chromatic aberration intensity coefficient, the scaling coefficient and the blur coefficient respectively, and be negatively correlated with the distortion coefficient, the magnification degree of the image obtained by the above procedure of image processing becomes larger frame by frame. In one of the possible implementations, after the user triggers the first trigger operation on the shooting interface shown in FIG. 2, a second trigger operation may also be triggered; in response to the second trigger operation, screen coordinates of the second trigger operation are obtained; for each second image obtained after the second trigger operation, coordinates of a trigger pixel on the second image are obtained based on the screen coordinates of the second trigger operation; a processing parameter corresponding to the second image is obtained based on a frame number of the second image and second mapping; and effect processing is performed on the second image based on the coordinates of the trigger pixel on the second image and the processing parameter corresponding to the second image. In the second mapping, the frame number may be negatively correlated with the chromatic aberration intensity coefficient, the scaling coefficient and the blur coefficient respectively, and be positively correlated with the distortion coefficient. As such, after the terminal device receives the second trigger operation, the magnification degree of the image obtained by the above procedure of image processing becomes smaller frame by frame, so that the change of amplification degree of the image after the user triggers the first trigger operation and the change of amplification degree of the image after the user triggers the second trigger operation are two opposite processes, that is, the magnification degree becomes larger frame by frame after the user triggers the first trigger operation, while the magnification degree becomes smaller frame by frame after the user triggers the second trigger operation, thereby enhancing the user's enjoyment in making videos.

It should be understood that in the first mapping, the relationship between the frame number and the chromatic aberration intensity coefficient, the scaling coefficient and the blur coefficient may be configured to be negative correlation, and the relationship between the frame number and the distortion coefficient may be configured to be positive correlation. In the second mapping, the relationship between the frame number and the chromatic aberration intensity coefficient, the scaling coefficient and the blur coefficient may be configured to be positive correlation, and the relationship between the frame number and the distortion coefficient may be configured to be negative correlation. The result of such a configuration is that the magnification degree becomes smaller frame by frame after the user triggers the first trigger operation, and the magnification degree becomes larger frame by frame after the user triggers the second trigger operation.

Figure 11:
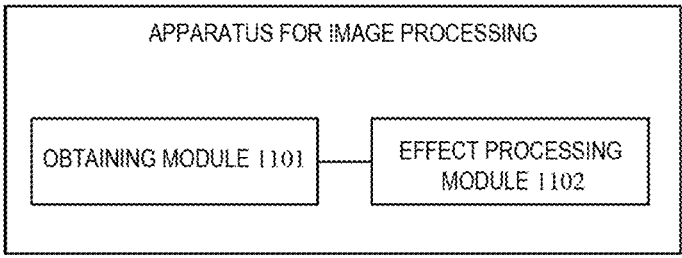
FIG. 11 shows a schematic diagram of a structure of the apparatus for image processing provided by the present disclosure.

FIG. 11 shows a schematic diagram of a structure of the apparatus for image processing provided by the present disclosure. As shown in FIG. 11, the apparatus for image processing provided by the present disclosure comprises:

an obtaining module 1101 configured for in response to a first trigger operation from a user, obtaining screen coordinates of the first trigger operation;

an effect processing module 1102 configured for obtaining, for each first image obtained after the first trigger operation, coordinates of a trigger pixel on the first image based on the screen coordinates of the first trigger operation; performing, based on the coordinates of the trigger pixel, effect processing on the first image to obtain an image with a magnifying glass effect.

Optionally, the effect processing module 1102 is specifically configured for:

obtaining a processing parameter corresponding to the first image based on a frame number of the first image and first mapping, the processing parameter comprising at least one of a chromatic aberration intensity coefficient, a distortion coefficient, a scaling coefficient, and a blur coefficient, the first mapping is used for indicating a correspondence between the frame number and the processing parameter; and performing, based on the coordinates of the trigger pixel and the processing parameter corresponding to the first image, the effect processing on the first image to obtain the image with the magnifying glass effect, wherein the effect processing corresponds to the processing parameter and comprises at least one of radial chromatic aberration processing, distortion processing, scaling processing, or radial blur processing.

Optionally, the processing parameter comprises the chromatic aberration intensity coefficient, and the effect processing comprises the radial chromatic aberration processing; the effect processing module 1102 is specifically configured for:

obtaining, for each pixel on the first image, a sum of color values of a plurality of sampling points corresponding to the pixel in each color channel based on the coordinates of the trigger pixel, coordinates of the pixel, a number of the sampling points, a step coefficient, an intensity coefficient corresponding to the color channel, a weight coefficient, a texture of the first image, and the chromatic aberration intensity coefficient; and determining a color value of the pixel in each color channel based on the sum of the color values of the plurality of sampling points corresponding to the pixel in the color channel.

Optionally, the effect processing module 1102 is specifically configured for:

determining a direction from the trigger pixel to the pixel based on the coordinates of the trigger pixel and the coordinates of the pixel;

determining a sampling step based on the direction from the trigger pixel to the pixel, the step coefficient, and the number of the sampling points;

determining, for each color channel of RGB channels, an offset corresponding to the color channel based on the direction from the trigger pixel to the pixel, the step coefficient, and the number of the sampling points, the chromatic aberration intensity coefficient and the intensity coefficient corresponding to the color channel; and determining, for each color channel of the RGB channels, the sum of the color values of the plurality of sampling points corresponding to the pixel in the color channel based on the texture of the first image, the coordinates of the pixel, the offset corresponding to the color channel, the sampling step, the number of the sampling points and the weight coefficient.

Optionally, the effect processing module 1102 is specifically configured for:

for each color channel of RGB channels, dividing the sum of the color values of the plurality of sampling points corresponding to the pixel in the color channel by the number of the sampling points to obtain the color value of the pixel in the color channel.

Optionally, the processing parameter comprises the distortion coefficient, and the effect processing comprises the distortion processing; the effect processing module 1102 is specifically configured for:

obtaining a distortion function based on the distortion coefficient;

determining, for each pixel on the first image, a pixel before distortion on the first image based on the coordinates of the trigger pixel, the coordinates of the pixel, a distance from the trigger pixel to the pixel and the distortion function, the pixel before distortion corresponding to the pixel; and determining a color value of the pixel before distortion as the color value of the pixel.

Optionally, the processing parameter comprises the scaling coefficient, and the effect processing comprises the scaling processing; the effect processing module 1102 is specifically configured for:

determining scaled vertex coordinates based on the coordinates of the trigger pixel, current vertex coordinates of a quadrilateral model and the scaling coefficient, the quadrilateral model being used for changing a display size of the image;

updating the vertex coordinates of the quadrilateral model to the scaled vertex coordinates; and mapping the first image to the quadrilateral model to obtain the image with the magnifying glass effect.

Optionally, the processing parameter comprises the blur coefficient, and the effect processing comprises the radial blur processing; the effect processing module 1102 is specifically configured for:

obtaining, for each pixel on the first image, a sum of color values of a plurality of sampling points corresponding to the pixel based on the coordinates of the trigger pixel, coordinates of the pixel, a number of the sampling points, a texture of the first image, and the blur coefficient; and obtaining a color value of the pixel based on the sum of the color values of the plurality of sampling points corresponding to the pixel.

Optionally, the effect processing module 1102 is specifically configured for:

determining a direction from the trigger pixel to the pixel based on the coordinates of the trigger pixel and the coordinates of the pixel; and determining the sum of the color values of the plurality of sampling points corresponding to the pixel based on the coordinates of the pixel, the number of the sampling points, the blur coefficient, the texture of the first image and the direction from the trigger pixel to the pixel.

Optionally, the effect processing module 1102 is specifically configured for:

dividing the sum of the color values of the plurality of sampling points corresponding to the pixel by the number of the sampling points to obtain the color value of the pixel.

Optionally, the effect processing module 1102 is specifically configured for:

performing, based on the coordinates of the trigger pixel and the processing parameter corresponding to the first image, the radial chromatic aberration processing, the distortion processing, the scaling processing, and the radial blur processing in sequence on the first image.

Optionally, in the first mapping, the frame number is positively correlated with the chromatic aberration intensity coefficient, the scaling coefficient and the blur coefficient respectively, and the frame number is negatively correlated with the distortion coefficient.

Optionally, the obtaining module 1101 is further configured for:

in response to a second trigger operation from the user, obtaining screen coordinates of the second trigger operation;

the effect processing module 1102 is further configured for:

obtaining, for each second image obtained after the second trigger operation, coordinates of a trigger pixel on the second image based on the screen coordinates of the second trigger operation; obtaining a processing parameter corresponding to the second image based on a frame number of the second image and second mapping; and performing, based on the coordinates of the trigger pixel on the second image and the processing parameter corresponding to the second image, effect processing on the second image, in the second mapping, the frame number is negatively correlated with the chromatic aberration intensity coefficient, the scaling coefficient and the blur coefficient respectively, and is positively correlated with the distortion coefficient.

The apparatus for image processing as shown in FIG. 11 may be used for performing the steps in any of the above method embodiments. The implementation principles and technical effects are analogous, and will not be repeated herein.

Figure 12:
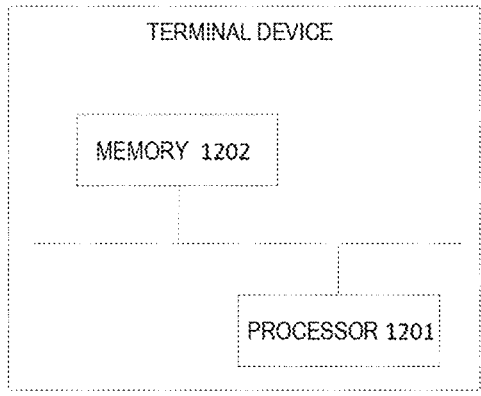
FIG. 12 shows a schematic diagram of a hardware structure of the terminal device provided by the present disclosure.

FIG. 12 shows a schematic diagram of a hardware structure of the terminal device provided by the present disclosure. As shown in FIG. 12, the terminal device provided by the present disclosure may comprise:

a processor 1201; and a memory 1202 for storing executable instructions by the processor;

wherein the processor 1201 is configured to carry out the steps of any of the method embodiments described above by executing the executable instructions. The implementation principles and technical effects are analogous and thus will not be described herein.

The present disclosure also provides a computer readable storage medium having a computer program stored thereon, wherein the computer program, when executed by a processor, causes the processor to carry out the steps of any of the method embodiments described above. The implementation principles and technical effects are analogous and thus will not be described herein.

The present disclosure also provides a computer program product comprising a computer program stored in a computer readable storage medium, and at least one processor can read the computer program from the computer readable storage medium, and the computer program, when executed by the at least one processor, carries out the steps of any of the method embodiments described above. The implementation principles and technical effects are analogous and thus will not be described herein.

The present disclosure also provides a computer program which, when executed by a processor, causes the processor to carry out the steps of any of the method embodiments described above. The implementation principles and technical effects are analogous and thus will not be described herein.

In the several embodiments provided by the present disclosure, it should be understood that the disclosed apparatuses and methods may be implemented by other ways. For example, the embodiments of the apparatus described above are only illustrative. For example, the division of the units is only a logical function division, and in practice, there may be other divisions, such as multiple units or components may be combined or integrated into another system, or some features may be ignored or not performed. On the other hand, the coupling or direct coupling or communication connection between each other shown or discussed may be an indirect coupling or communication connection through some interfaces, apparatuses or units, and may be in electrical, mechanical or other forms.

The units described as separate components may or may not be physically separated, and the components shown as units may or may not be physical units, that is, they may be located in one place, or they may be distributed over multiple network units. Some or all of the units can be selected according to actual needs to realize the purpose of the solutions of the embodiments.

In addition, the functional units in various embodiments of the present disclosure may be integrated in a single processing unit, or each unit may exist physically alone, or two or more units may be integrated into a single unit. The integrated units described above may be implemented either in the form of hardware or in the form of hardware plus software functional units.

The above-mentioned integrated unit implemented in the form of a software functional unit may be stored in a computer readable storage medium. The above-mentioned software functional unit stored in a storage medium includes several instructions which cause a computer device (which may be a personal computer, a server, or a network device, etc.) or a processor to carry out some of the steps of the methods described in various embodiments of the present disclosure. The aforementioned storage medium includes a USB flash drive, a removable hard disk, Read-Only Memory (ROM), Random Access Memory (RAM), a magnetic disk, or a compact disc, and other medium in which the program code can be stored.

It should be understood that the processor described in the present disclosure may be a central processing unit (CPU). The processor may also be other general-purpose processors, digital signal processors DSP), application specific integrated circuits (ASIC), etc. The general-purpose processor may be a microprocessor, or the processor may be any conventional processor, etc. The steps of the methods disclosed in connection with the present disclosure may be performed directly by a hardware processor or by a combination of hardware and software modules in the processor.

Finally, it should be noted that the various embodiments described above are only used to illustrate the technical solutions of the present disclosure, but not to limit them; although the present disclosure has been described in detail with reference to the foregoing embodiments, those of ordinary skill in the art should understand that the solutions described in the foregoing embodiments can still be modified, or some or all of the technical features can be equivalently replaced; and those modification or replacement do not cause the essence of corresponding solutions to depart from the scope of the solutions of various embodiments of the present disclosure.

What is claimed is:

1. A computer-implemented method for image processing comprising:

in response to a first trigger operation from a user, obtaining screen coordinates of the first trigger operation; and obtaining, for each first image obtained after the first trigger operation, coordinates of a trigger pixel on the first image based on the screen coordinates of the first trigger operation; and performing, based on the coordinates of the trigger pixel, effect processing on the first image to obtain an image with a magnifying glass effect, comprising:

obtaining a processing parameter corresponding to the first image based on a frame number of the first image and first mapping, the processing parameter comprising at least one of a chromatic aberration intensity coefficient, a distortion coefficient, a scaling coefficient, and a blur coefficient, the first mapping is used for indicating a correspondence between the frame number and the processing parameter;

performing, based on the coordinates of the trigger pixel and the processing parameter corresponding to the first image, the effect processing on the first image to obtain the image with the magnifying glass effect, wherein the effect processing corresponds to the processing parameter and comprises at least one of radial chromatic aberration processing, distortion processing, scaling processing, or radial blur processing.

2. The method of claim 1, wherein the processing parameter comprises the chromatic aberration intensity coefficient, and the effect processing comprises the radial chromatic aberration processing, and wherein performing the effect processing on the first image based on the coordinates of the trigger pixel and the processing parameter corresponding to the first image comprises:

obtaining, for each pixel on the first image, a sum of color values of a plurality of sampling points corresponding to the pixel in each color channel based on the coordinates of the trigger pixel, coordinates of the pixel, a number of the sampling points, a step coefficient, an intensity coefficient corresponding to the color channel, a weight coefficient, a texture of the first image, and the chromatic aberration intensity coefficient; and determining a color value of the pixel in each color channel based on the sum of the color values of the plurality of sampling points corresponding to the pixel in the color channel.

3. The method of claim 2, wherein obtaining the sum of color values of the plurality of sampling points corresponding to the pixel in each color channel based on the coordinates of the trigger pixel, the coordinates of the pixel, the number of the sampling points, the step coefficient, the intensity coefficient corresponding to the color channel, the weight coefficient, the texture of the first image, and the chromatic aberration intensity coefficient comprises:

determining a direction from the trigger pixel to the pixel based on the coordinates of the trigger pixel and the coordinates of the pixel;

determining a sampling step based on the direction from the trigger pixel to the pixel, the step coefficient, and the number of the sampling points;

determining, for each color channel of RGB channels, an offset corresponding to the color channel based on the direction from the trigger pixel to the pixel, the step coefficient, and the number of the sampling points, the chromatic aberration intensity coefficient and the intensity coefficient corresponding to the color channel; and determining, for each color channel of the RGB channels, the sum of the color values of the plurality of sampling points corresponding to the pixel in the color channel based on the texture of the first image, the coordinates of the pixel, the offset corresponding to the color channel, the sampling step, the number of the sampling points and the weight coefficient.

4. The method of claim 2, wherein determining the color value of the pixel in each color channel based on the sum of the color values of the plurality of sampling points corresponding to the pixel in the color channel comprises:

for each color channel of RGB channels, dividing the sum of the color values of the plurality of sampling points corresponding to the pixel in the color channel by the number of the sampling points to obtain the color value of the pixel in the color channel.

5. The method of claim 1, wherein the processing parameter comprises the distortion coefficient, and the effect processing comprises the distortion processing, and wherein performing the effect processing on the first image based on the coordinates of the trigger pixel and the processing parameter corresponding to the first image comprises:

obtaining a distortion function based on the distortion coefficient;

determining, for each pixel on the first image, a pixel before distortion on the first image based on the coordinates of the trigger pixel, the coordinates of the pixel, a distance from the trigger pixel to the pixel and the distortion function, the pixel before distortion corresponding to the pixel; and determining a color value of the pixel before distortion as the color value of the pixel.

6. The method of claim 1, wherein the processing parameter comprises the scaling coefficient, and the effect processing comprises the scaling processing, and wherein performing the effect processing on the first image based on the coordinates of the trigger pixel and the processing parameter corresponding to the first image comprises:

determining scaled vertex coordinates based on the coordinates of the trigger pixel, current vertex coordinates of a quadrilateral model and the scaling coefficient, the quadrilateral model being used for changing a display size of the image;

updating the vertex coordinates of the quadrilateral model to the scaled vertex coordinates; and mapping the first image to the quadrilateral model to obtain the image with the magnifying glass effect.

7. The method of claim 1, wherein the processing parameter comprises the blur coefficient, and the effect processing comprises the radial blur processing, and wherein performing the effect processing on the first image based on the coordinates of the trigger pixel and the processing parameter corresponding to the first image comprises:

obtaining, for each pixel on the first image, a sum of color values of a plurality of sampling points corresponding to the pixel based on the coordinates of the trigger pixel, coordinates of the pixel, a number of the sampling points, a texture of the first image, and the blur coefficient; and obtaining a color value of the pixel based on the sum of the color values of the plurality of sampling points corresponding to the pixel.

8. The method of claim 7, wherein obtaining the sum of color values of the plurality of sampling points corresponding to the pixel based on the coordinates of the trigger pixel, the coordinates of the pixel, the number of the sampling points, the texture of the first image, and the blur coefficient comprises:

determining a direction from the trigger pixel to the pixel based on the coordinates of the trigger pixel and the coordinates of the pixel; and determining the sum of the color values of the plurality of sampling points corresponding to the pixel based on the coordinates of the pixel, the number of the sampling points, the blur coefficient, the texture of the first image and the direction from the trigger pixel to the pixel.

9. The method of claim 7, wherein obtaining the color value of the pixel based on the sum of the color values of the plurality of sampling points corresponding to the pixel comprises:

dividing the sum of the color values of the plurality of sampling points corresponding to the pixel by the number of the sampling points to obtain the color value of the pixel.

10. The method of claim 1, wherein performing the effect processing on the first image based on the coordinates of the trigger pixel and the processing parameter corresponding to the first image comprises:

performing, based on the coordinates of the trigger pixel and the processing parameter corresponding to the first image, the radial chromatic aberration processing, the distortion processing, the scaling processing, and the radial blur processing in sequence on the first image.

11. The method of claim 1, wherein in the first mapping, the frame number is positively correlated with the chromatic aberration intensity coefficient, the scaling coefficient and the blur coefficient respectively, and is negatively correlated with the distortion coefficient.

12. The method of claim 11, wherein the method further comprises:

in response to a second trigger operation from the user, obtaining screen coordinates of the second trigger operation;

obtaining, for each second image obtained after the second trigger operation, coordinates of a trigger pixel on the second image based on the screen coordinates of the second trigger operation;

obtaining a processing parameter corresponding to the second image based on a frame number of the second image and second mapping; and performing, based on the coordinates of the trigger pixel on the second image and the processing parameter corresponding to the second image, effect processing on the second image, wherein in the second mapping, the frame number is negatively correlated with the chromatic aberration intensity coefficient, the scaling coefficient and the blur coefficient respectively, and is positively correlated with the distortion coefficient.

13. A non-transitory computer readable storage medium having a computer program stored thereon, wherein the computer program, when executed by a processor, causes the processor to carry out a method comprising:

in response to a first trigger operation from a user, obtaining screen coordinates of the first trigger operation;

obtaining, for each first image obtained after the first trigger operation, coordinates of a trigger pixel on the first image based on the screen coordinates of the first trigger operation; and performing, based on the coordinates of the trigger pixel, effect processing on the first image to obtain an image with a magnifying glass effect, comprising:

obtaining a processing parameter corresponding to the first image based on a frame number of the first image and first mapping, the processing parameter comprising at least one of a chromatic aberration intensity coefficient, a distortion coefficient, a scaling coefficient, and a blur coefficient, the first mapping is used for indicating a correspondence between the frame number and the processing parameter;

performing, based on the coordinates of the trigger pixel and the processing parameter corresponding to the first image, the effect processing on the first image to obtain the image with the magnifying glass effect, wherein the effect processing corresponds to the processing parameter and comprises at least one of radial chromatic aberration processing, distortion processing, scaling processing, or radial blur processing.

14. A terminal device comprising:

a processor; and a non-transitory memory for storing executable instructions by the processor;

wherein the processor is configured to carry out a method comprising:

in response to a first trigger operation from a user, obtaining screen coordinates of the first trigger operation;

obtaining, for each first image obtained after the first trigger operation, coordinates of a trigger pixel on the first image based on the screen coordinates of the first trigger operation; and performing, based on the coordinates of the trigger pixel, effect processing on the first image to obtain an image with a magnifying glass effect, comprising:

obtaining a processing parameter corresponding to the first image based on a frame number of the first image and first mapping, the processing parameter comprising at least one of a chromatic aberration intensity coefficient, a distortion coefficient, a scaling coefficient, and a blur coefficient, the first mapping is used for indicating a correspondence between the frame number and the processing parameter;

performing, based on the coordinates of the trigger pixel and the processing parameter corresponding to the first image, the effect processing on the first image to obtain the image with the magnifying glass effect, wherein the effect processing corresponds to the processing parameter and comprises at least one of radial chromatic aberration processing, distortion processing, scaling processing, or radial blur processing.

15. The terminal device of claim 14, wherein the processing parameter comprises the chromatic aberration intensity coefficient, and the effect processing comprises the radial chromatic aberration processing, and wherein the processor is configured to perform the effect processing on the first image based on the coordinates of the trigger pixel and the processing parameter corresponding to the first image by:

obtaining, for each pixel on the first image, a sum of color values of a plurality of sampling points corresponding to the pixel in each color channel based on the coordinates of the trigger pixel, coordinates of the pixel, a number of the sampling points, a step coefficient, an intensity coefficient corresponding to the color channel, a weight coefficient, a texture of the first image, and the chromatic aberration intensity coefficient; and determining a color value of the pixel in each color channel based on the sum of the color values of the plurality of sampling points corresponding to the pixel in the color channel.

16. The terminal device of claim 14, wherein the processing parameter comprises the distortion coefficient, and the effect processing comprises the distortion processing, and wherein the processor is configured to perform the effect processing on the first image based on the coordinates of the trigger pixel and the processing parameter corresponding to the first image by:

obtaining a distortion function based on the distortion coefficient;

determining, for each pixel on the first image, a pixel before distortion on the first image based on the coordinates of the trigger pixel, the coordinates of the pixel, a distance from the trigger pixel to the pixel and the distortion function, the pixel before distortion corresponding to the pixel; and determining a color value of the pixel before distortion as the color value of the pixel.

17. The terminal device of claim 14, wherein the processing parameter comprises the scaling coefficient, and the effect processing comprises the scaling processing, and wherein the processor is configured to perform the effect processing on the first image based on the coordinates of the trigger pixel and the processing parameter corresponding to the first image by:

determining scaled vertex coordinates based on the coordinates of the trigger pixel, current vertex coordinates of a quadrilateral model and the scaling coefficient, the quadrilateral model being used for changing a display size of the image;

updating the vertex coordinates of the quadrilateral model to the scaled vertex coordinates; and mapping the first image to the quadrilateral model to obtain the image with the magnifying glass effect.

18. The terminal device of claim 14, wherein the processing parameter comprises the blur coefficient, and the effect processing comprises the radial blur processing, and wherein the processor is configured to perform the effect processing on the first image based on the coordinates of the trigger pixel and the processing parameter corresponding to the first image by:

obtaining, for each pixel on the first image, a sum of color values of a plurality of sampling points corresponding to the pixel based on the coordinates of the trigger pixel, coordinates of the pixel, a number of the sampling points, a texture of the first image, and the blur coefficient; and obtaining a color value of the pixel based on the sum of the color values of the plurality of sampling points corresponding to the pixel.

* * * * *